United States Patent
Sarkar et al.

(10) Patent No.: US 8,565,521 B2
(45) Date of Patent: Oct. 22, 2013

(54) APPARATUS FOR THE CLASSIFICATION OF OBSERVERS ACCORDING TO THEIR VISUAL CHARACTERISTICS

(75) Inventors: Abhijit Sarkar, Stamford, CT (US); Laurent Blonde, Thorigne-Fouillard (FR); Patrick Morvan, Laille (FR); Marine Le Breton, Antony (FR)

(73) Assignee: Thomson Licensing, Issy-les-Moulineaux (FR)

( * ) Notice: Subject to any disclaimer, the term of this patent is extended or adjusted under 35 U.S.C. 154(b) by 0 days.

(21) Appl. No.: 13/640,476

(22) PCT Filed: Apr. 8, 2011

(86) PCT No.: PCT/EP2011/055539
§ 371 (c)(1),
(2), (4) Date: Oct. 10, 2012

(87) PCT Pub. No.: WO2011/124698
PCT Pub. Date: Oct. 13, 2011

(65) Prior Publication Data
US 2013/0027567 A1    Jan. 31, 2013

(30) Foreign Application Priority Data

Apr. 9, 2010    (EP) .................................... 10290193
Oct. 11, 2010    (EP) .................................... 10306106

(51) Int. Cl.
*G06K 9/00*    (2006.01)

(52) U.S. Cl.
USPC ........................................................ 382/165

(58) Field of Classification Search
None
See application file for complete search history.

(56) References Cited

U.S. PATENT DOCUMENTS

| | | | | |
|---|---|---|---|---|
| 4,769,695 A * | 9/1988 | Terashita | ...................... | 358/527 |
| 5,012,431 A * | 4/1991 | Stanziola | ...................... | 382/162 |
| 5,615,282 A * | 3/1997 | Spiegel et al. | ................ | 382/167 |
| 5,739,928 A * | 4/1998 | Scott | ............................ | 358/520 |
| 7,769,475 B2 * | 8/2010 | Fujimoto et al. | ................ | 700/59 |
| 2009/0148037 A1 * | 6/2009 | Moriyama et al. | ........... | 382/154 |
| 2009/0257648 A1 | 10/2009 | Edge | | |

OTHER PUBLICATIONS

Perez-Ocon F et al Contribution to the experimental review of the colorimetrie standard observer Color Research and Application, John Wiley.

Ramanath R: Minimizing observer metamerism in display systems Colour Reseach and Application.

Sarkar A et al: Study of Observer Variability in Modern Display Colorimetry: Comparison of CIE 2006 Model and 10° Standard Observer.

Masahiro Yamaguchi et al Color image reproduction based on the multispectral and multispectral and multiprimary imaging: Experimental evaluation.

P. Csuti et al: Colour matching experiments with RGB-LEDs, color Research & Application.

(Continued)

*Primary Examiner* — Samir Ahmed
(74) *Attorney, Agent, or Firm* — Patricia A. Verlangieri; Robert D. Shedd

(57) ABSTRACT

Preferably, seven classes of observers are defined, according to different sets of Color Matching Functions. By displaying specific color patches of a classification chart using color display devices having different sets of primaries, and by asking an actual observer to compare his perception of the same color as displayed on each color display device, the method allows assigning said observer his specific class. It is proposed a specific apparatus to implement this method.

7 Claims, 9 Drawing Sheets

Simultaneous Presentation

Ref Display Device

Test Display Device

(56) References Cited

OTHER PUBLICATIONS

Murakami Y et al: Color conversion method for multi-primary display for spectral color reproduction, Journal of Electronic Imaging, SPIE / IS & T.
EP Search Report Dated Jul. 30, 2010 and PCT Search Report Jul. 5, 2011.
CIE Technical Report CIE 170-1:2006, "Fundamental Chromaticity Diagram With Physiological Axes—Part 1", Jan. 1, 2006, pp. 1-49.
Stiles, W.S and Burch, J.M., "N. P. L. Colour-matching investigation: Final Report"; Optica Acta, vol. 6, Jan. 1, 1959, pp. 1-26.
Sharpe, L. T. et al., "Opsin genes, cone photopigments, color vision, and color blindness", Color Vision: From Genes to Perception, 1st Edition, Cambridge University Press, Cambridge, Jan. 1, 2001, pp. 3-52.
Stockman, A. and Sharpe L.T., "The spectral sensitivities of the middle-and long-wavelength-sensitive cones derived from measurements in observers of known genotype", Vision Research, vol. 40, Jan. 5, 2000, pp. 1711-1737.
Sarkar A. et al., "Toward Reducing Observer Metamerism Issue in Industrial Applications: Colorimetric Observer Categories and Observer Classification", The 18th Color Imaging Conference, San Antonio, Texas, Nov. 1, 2010, pp. 1-7.
Sarkar, A. et al., "Study of Observer Variability in Modern Display Colorimetry: An Analysis of CIE 2006 Model", 11th Congress of the International Colour Association (A/C) 2009, Sydney, Australia, Jan. 1, 2009, pp. 1-4.

* cited by examiner

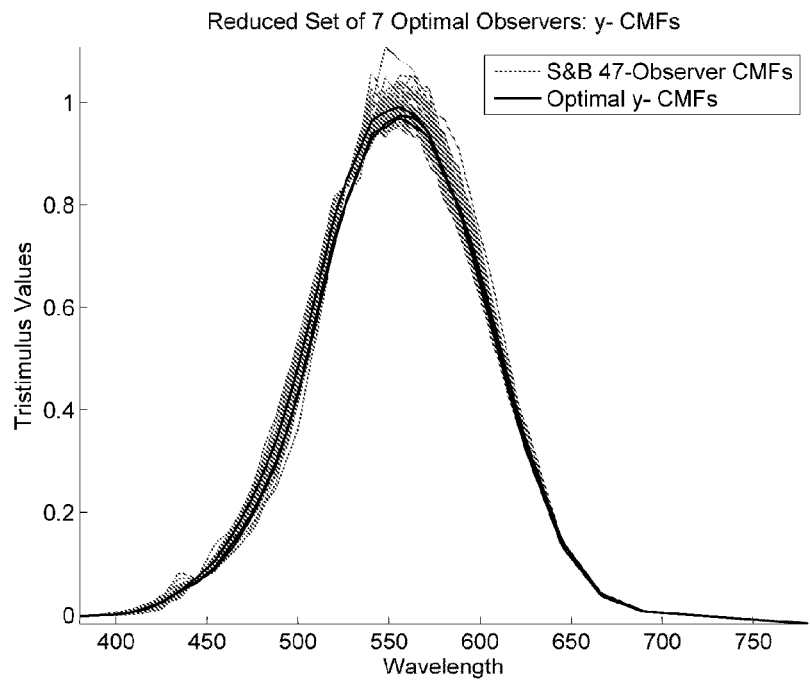
Fig.3
Fig.4
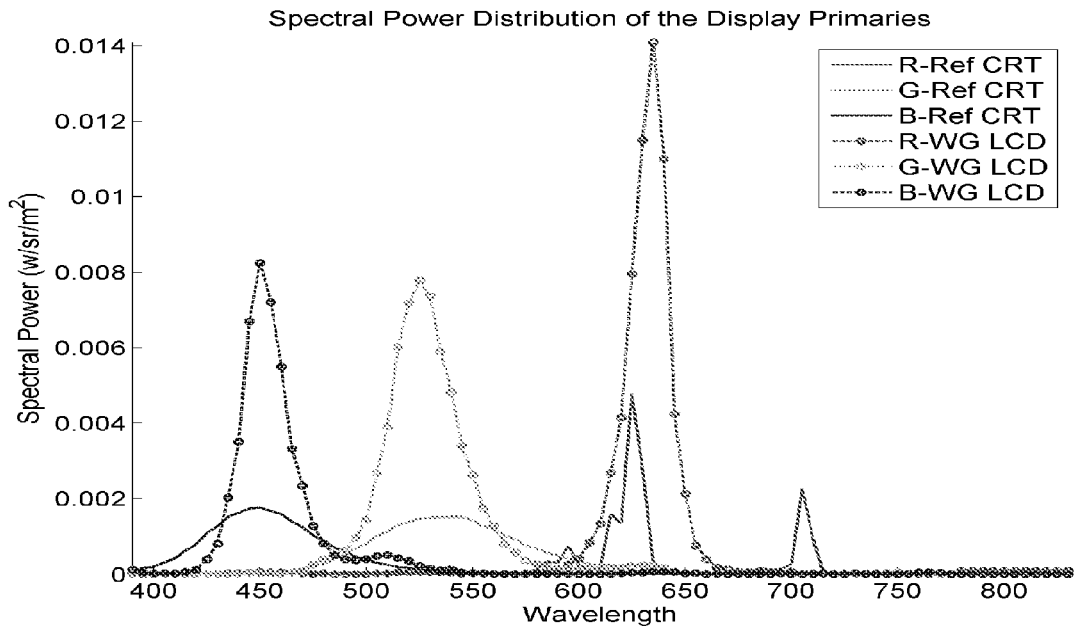

Top View

APPARATUS FOR THE CLASSIFICATION OF OBSERVERS ACCORDING TO THEIR VISUAL CHARACTERISTICS

This application claims the benefit, under 35 U.S.C. §365 of International Application PCT/EP2011/055539, filed Apr. 8, 2011, which was published in accordance with PCT Article 21(2) on Oct. 13, 2011 in English and which claims the benefit of European patent applications No. 10290193.1, filed on Apr. 9, 2010 and 10306106.5 of Oct. 11, 2010.

The invention relates to a method for the classification of observers according to their visual characteristics.

Various recent studies have shown that variations in observers' colour vision characteristics can be a significant issue in modern display colourimetry, since peaky colour primaries (commonly red, green and blue) are often used to achieve more vivid and saturated colours.

The colour matching functions are very well known as the numerical description of the chromatic response of an observer. The CIE has defined a set of three colour-matching functions ("CMF"), called $\bar{x}(\lambda), \bar{y}(\lambda)$, and $\bar{z}(\lambda)$, which can be thought of as the spectral sensitivity curves of three linear light detectors that yield the tristimulus values X, Y, and Z in the CIE XYZ linear visual colour space. There are two sets of standard observer CMFs, depending on the field of view: CIE-1964 10° or CIE-1931 2°. As illustrated on FIG. 1 for CIE-1964 10°, these three CMF functions are respectively for the long-, medium- and short-wavelength range.

According to basic colorimetry, the tristimulus values (X,Y,Z) as expressed in the CIE-XYZ color space, of a color of an object as perceived by a standard observer are obtained by the integration of the spectral power distribution of a standard light source ($S_\lambda$), the reflectance factor of the object ($R_\lambda$), and the color matching functions of an average, standard observer ($\bar{x}_\lambda, \bar{y}_\lambda$ and $\bar{z}_\lambda$). If k is a normalization factor that assigns the luminance of white an arbitrary value of 100, we have the following definitions:

$$X = k\sum_\lambda S_\lambda R_\lambda \bar{x}_\lambda \Delta\lambda; \quad Y = k\sum_\lambda S_\lambda R_\lambda \bar{y}_\lambda \Delta\lambda; \quad Z = k\sum_\lambda S_\lambda R_\lambda \bar{z}_\lambda \Delta\lambda$$

$$k = \frac{100}{\sum_\lambda S_\lambda \bar{y}_\lambda \Delta\lambda}$$

Since the tristimulus values (X,Y,Z) are computed by wavelength-wise integration, two colour tristimuli with very different spectral power distribution can give rise to identical visual response for a given observer, leading to a "metameric" colour match. Such a match established by one observer can, and quite often does, lead to a mismatch for a different observer, as the second observer is visually characterized by a set of CMFs that is different from the former. This phenomenon is commonly termed as observer metamerism.

Various recent studies have shown that observer variability can be a significant issue notably in modern display colourimetry. This single set of three CMFs can often be unacceptably different from individual and average observer matches, and vice versa. In recent studies, the mean and maximum values of the standard observer-predicted colour difference between individual observer colour matches were found to be as high as 1.4 and 3.3 $\Delta E^*_{00}$ respectively, as expressed in the Lab color space.

The relevance of the observer variability is obviously quite dependent on the application context. The topic of observer metamerism has sparked renewed interest in the recent years with the proliferation of wide colour-gamut image display devices. Whether based on LED (Light Emitting Diode) or employing laser primaries, all these image display devices compete with each other in achieving more vivid, more saturated and brighter colours: see Ramanath R. (2009), "Minimizing Observer Metamerism in Display System", Colour Res. & Appl., 34(5): pg. 391-398. See also Fairchild M. D. and Wyble D. R. (2007), "Mean Observer Metamerism and the Selection of Display Primaries", Final Program and Proceedings-IS&T/SID Colour Imaging Conference, pg. 151-156, Albuquerque, N. Mex., USA. On the flipside, these image display devices are particularly susceptible to observer variability since their narrow-band (i.e. peaky spectral characteristics) primaries cause noticeable shift in chromaticities of perceived colours with only relatively minor change in the visual characteristics of the observer.

In 1989, the CIE published a report providing a method for evaluating the average values and the range of colour mismatch for a metameric colour pair when an actual observer with normal colour vision is substituted for the so-called "standard observer" of the CIE. Four sets of deviation functions were proposed to characterize the tolerance ellipsoid of colour mismatch resulting from observer metamerism. This method can be used to derive an observer metamerism index, but it does not attempt to derive new sets of CMFs. Further, this method significantly under-predicts observer variability, and was never adopted by the industry.

In a more recent theoretical analysis disclosed by Sarkar A., Blondé L., Le Callet P., Autrusseau F., Stauder J., Morvan P. (2009), in "Study of Observer Variability on Modern Display Colourimetry: Comparison of CIE 2006 Model and 10° Standard Observer" (Final Program and Proceedings, The 11th Congress of the International Colour Association (AIC) 2009, Sydney, Australia), it was found that the CIE 10° standard observer functions, as well as the average observer functions from a recent physiological model (proposed by CIE in 2006), do not accurately predict real observers' CMFs averaged within various age-groups. Because of this prediction error, colours on a narrow-band, wide-gamut display and a broad-band (smooth spectral characteristics) CRT display (Cathode Ray Tube), which are supposed to be matched based on real observer data and actual display spectral characteristics, were predicted to have significant colourimetric differences. The experimental data used in the study came from the most comprehensive colour matching experiments till date, performed by Stiles and Burch in 1959, on which the CIE 10° standard observer is based. This analysis showed that when it comes to modern image display devices, the issue of observer variability can cause conventional colourimetry to fail being accurate for a wide range of observers having very different CMFs. The extent of this failure will depend on the spectral characteristics of the display, the specific colours that are being reproduced on the image display device, as well as on the CMFs of the observer viewing the image display device.

It has been found that actual observers may be classified into different classes, for instance seven classes, each class being characterized by a specific class of observers.

An aim of the invention is a method to assign any actual observer to one of these classes and to the corresponding set of CMFs.

For this purpose, a subject of the invention is a method for the classification of an observer over a plurality of classes, each class being characterized by a set of Colour Matching Functions, said method using a classification chart of N colours, each colour being characterized by its specific spec tral power distribution, said method comprising the following steps:

1) for each colour of the classification chart characterized by its specific spectral power distribution and its perception, using a first set of primaries, displaying a first version of said colour by controlling said primaries with a first set of control values such that said first displayed colour version is perceived with a given perception by an observer visually characterized by a first set of Colour Matching Functions related to the first class of said plurality, using a second set of primaries having a spectral power distribution different from the spectral power distribution of the first set of primaries, displaying a set of second colour versions comprising a second version of said colour for each class of said plurality, each second colour version which is then associated with a given class of observers being obtained by controlling said primaries of second set with a second set of control values such that said second colour version is approximately perceived with the same given perception by an observer visually characterized by a set of Colour Matching Functions related to said class, asking the observer to find which of his perception of said second colour versions of said set fits the best with his perception of said first colour version, 2) assigning the observer with the most frequent class among all classes related to the different best fitted second versions of all colour of the classification chart.

Advantageously, in the method for the classification of an observer according to the invention, the N observable colours of said classification chart are chosen such that the differences of their perception by observers visually characterized by the different sets of Colour Matching Functions is maximized.

An aim of the invention is also to provide an apparatus for classifying a visual observer among a plurality of M observer classes, wherein each class is characterized by the colour vision of a specific observer, wherein M≥3, and where the colour vision of the specific observers of these M observer classes are different, comprising:

a reference colour display device using a first set of primaries to display versions of colours on a first screen, and a test colour display device using a second set of primaries to display versions of colours on a second screen, said first set of primaries $(DP)^R$ being different from said second set of primaries;

A memory storing a classification chart of a plurality of N different colours;

Means for providing, for each colour of said classification chart stored in said memory, a first version of said colour displayable on said first screen by said reference colour display device, and, moreover, for each of said M classes of observers, a second version of said colour displayable on said second screen by said test colour display device which is defined such that, when displayed on the second screen, this second version is perceived as the same colour as the colour perceived on the first screen when displaying said first version by the specific observer the color vision of which characterizes said observer class;

Means to present, in front of said observer-to-classify, a first version of each colour displayed by said reference colour display device and each of the M second versions of the same colour displayed by said test colour display device, A selector provided with a command allowing said observer-to-classify to select, each time a color of said classification chart is presented to observer-to-classify as a first displayed version and as M different second displayed versions, which one of said displayed second versions of said color is perceived by said observer-to-classify as matching the best with his perception of the corresponding first displayed version of the same color;

Means for assigning said observer-to-classify to the same observer class as the observer class of the specific observer who perceives the second version that is selected by said selector as having the same color as the first version that is simultaneously displayed;

Means for averaging the class assignments of said observer-to-classify performed by said means for assigning over all selections performed using said selector, in order to deliver a global assignment of said observer to at least one of said plurality of M classes of observers.

Preferably, the number M of classes inferior or equal to 7. The colour vision of the specific observer of each class is preferably characterized by a set of Colour Matching Functions. Each specific observer of a class is characterized by a specific set of Colour Matching Functions, such that all sets are different one from another.

For each colour of the classification chart, we have a first version of colour which is displayable on the first screen by the reference colour display device; preferably, the memory stores a first set of control signals adapted to control the reference colour display device in order to display this first version. Moreover, for each class of observers, we have a second version of the same colour which is displayable on said second screen by the test colour display device; each second version of a given colour for a given class is defined such that, when this second version is displayed using the test colour display device, the specific observer of this class perceives the same colour as the colour provided by the first version of the same colour displayed by the reference colour display device. It means that the first version of a colour and each second version of the same color for a given class are perceived, when displayed, as the same color by the specific observer the color vision of which characterizes this class. Preferably, for each second version, the memory stores a second set of control signals adapted to control the test colour display device in order to display this second version. Each control signal of the first and second set of control signals controls a specific primary of the first or second set of primary of the colour display devices.

According to a first variant, the presenting means are adapted to present versions of colour successively by pairs, each pair comprising a first version of a colour and one of said second versions of the same colour presented within the same bipartite field.

According to a first variant, the presenting means are adapted to present simultaneously, within the same field, a first version of a colour and all second versions of the same colour.

The first set of primaries is different from the second set of primaries. The primaries of the first set is notably adapted to generate versions of colours that are perceived approximately similarly by observers even when they have very different colour perception characteristics, as, on the opposite, the primaries of the second set is notably adapted to generate versions of colours that may be perceived very differently by observers even when they have only little difference in colour perception. The primaries of the first set is notably adapted to generate versions of colours that generate high perceptual variability of perception among observers, as, on the opposite, the primaries of the second set is notably adapted to generate versions of colours that generate a relatively stable perception among observers.

Preferably, in at least one of the following spectral regions: 580 nm±12.5 nm, 520 nm±12.5 nm, and 426 nm±12.5 nm, the cumulative luminous intensity of the spectral distribution of said second set of primaries in said at least one region is superior by at least a factor 2 to the cumulative luminous intensity of the spectral distribution of said first set of primaries in said at least one region.

Preferably, each primary of at least the second set of primaries is provided by LEDs.

The colours of the classification chart are electronically stored in the memory of the apparatus. Each colour is advantageously stored with the first set of control signals for the display of a first version of this colour by the reference colour display device, and with the M second sets of control signals for the display of M different second versions of this colour by the test colour display device. The colour may be stored as an index, or, preferably, as a specific spectral distribution that allows advantageously the calculation of the corresponding sets of control signals, as described below with more details.

The different colours of the classification chart should preferably produce different perceptions at least for an observer of any given class, whatever is this class. Preferably, the N different colours of said classification chart are such that, for an observer of any of the M observer classes, any two different colours of this chart produce different colour perceptions for said observer, when theses colours are displayed as a first version using said reference colour display device.

In order to improve the efficiency of the classification method implemented on the apparatus for observer classification of the invention, the colour that produce the largest colour differences ($\Delta E^*_{00}$) of perception between the M classes of observers are preferably selected.

Preferably, the N colours of said classification chart are such that, over each color of said classification chart and over each specific observer of the plurality of M classes, the difference between the perception of the first version of said colour displayed by said reference colour display device and the perception of the second version of said colour for said observer class displayed by said test colour display device is maximized.

The invention will be more clearly understood on reading the description which follows, given by way of non-limiting example and with reference to the appended figures in which:

FIG. 1, already mentioned, illustrates the well known set of CMFs of the CIE 10° standard observer;

FIGS. 2, 3 and 4 illustrate seven different sets of CMFs characterizing seven classes of observers cl-1 to cl-7: FIG. 2 for the seven x-CMFs, FIG. 3 for the seven y-CMFs, FIG. 4 for the seven z-CMFs; the seven reduced sets of CMFs are obtained through a two-step process described in the following pages FIG. 5 shows the spectral power distribution of the three primaries of the CRT and the LCD used respectively as the reference colour display device and as the test colour display device in the first example of apparatus for observer classification according to the invention;

Figure 1:
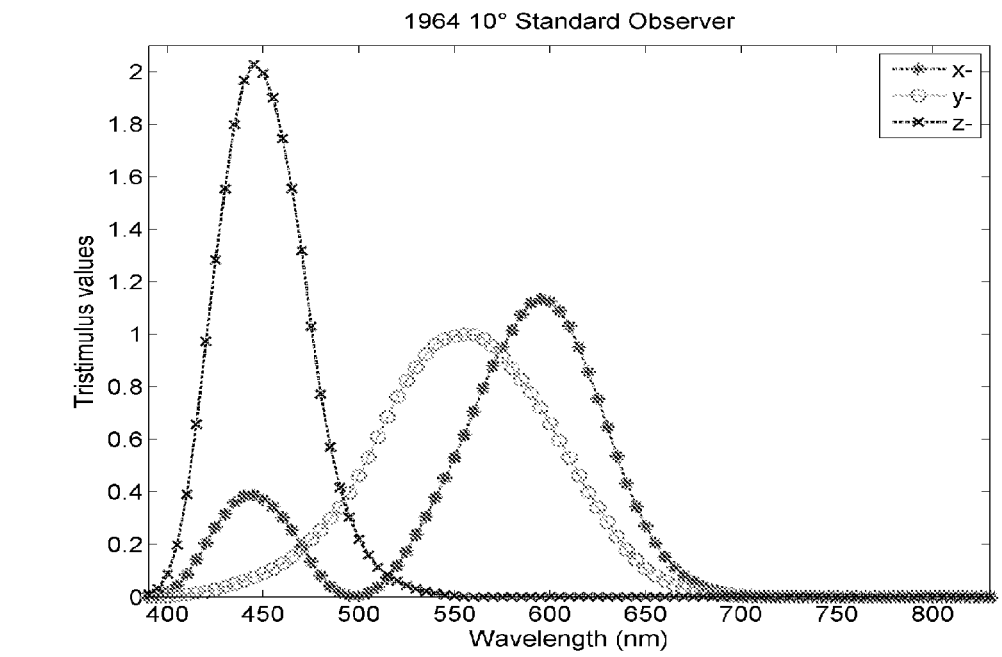
Figure 2:
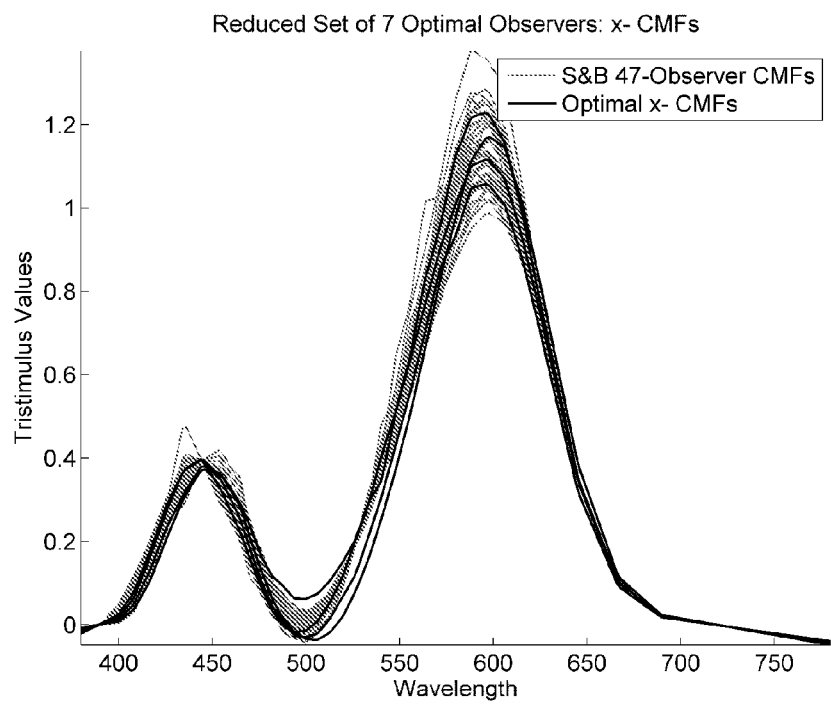
Figure 8:
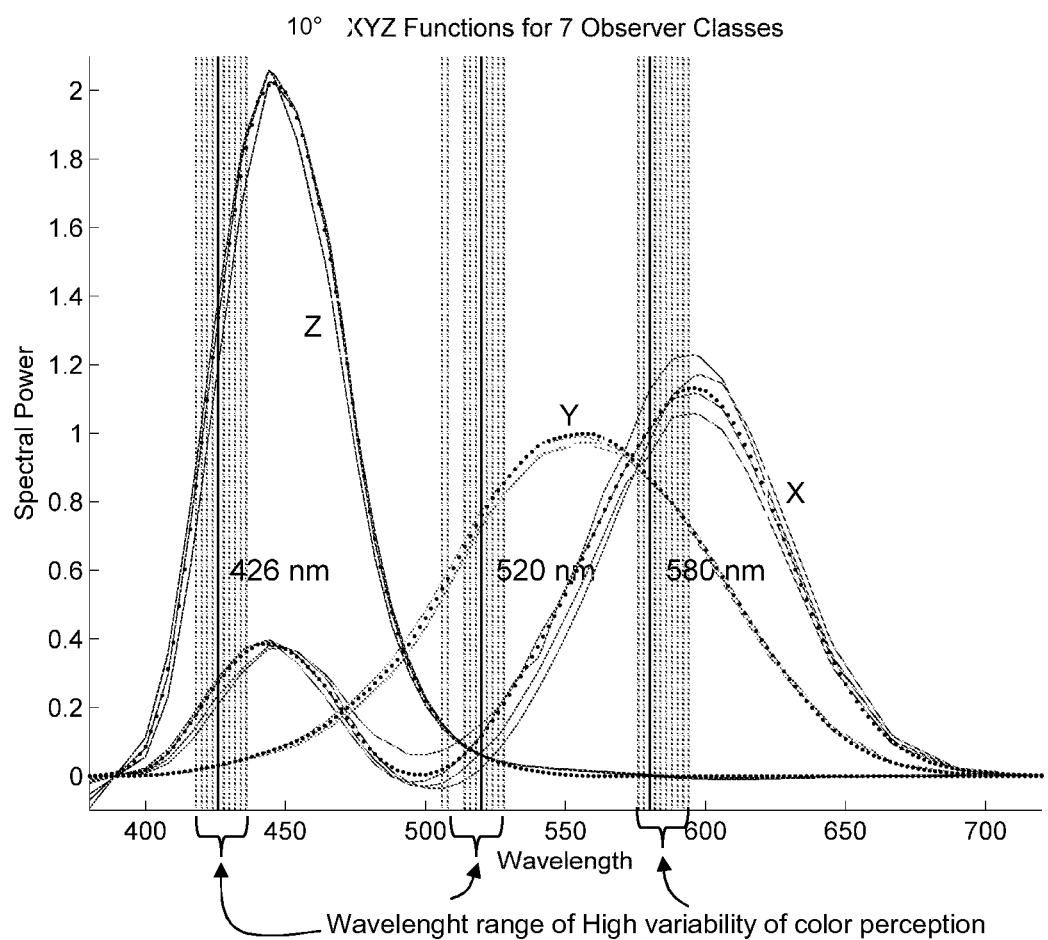
Figure 9:
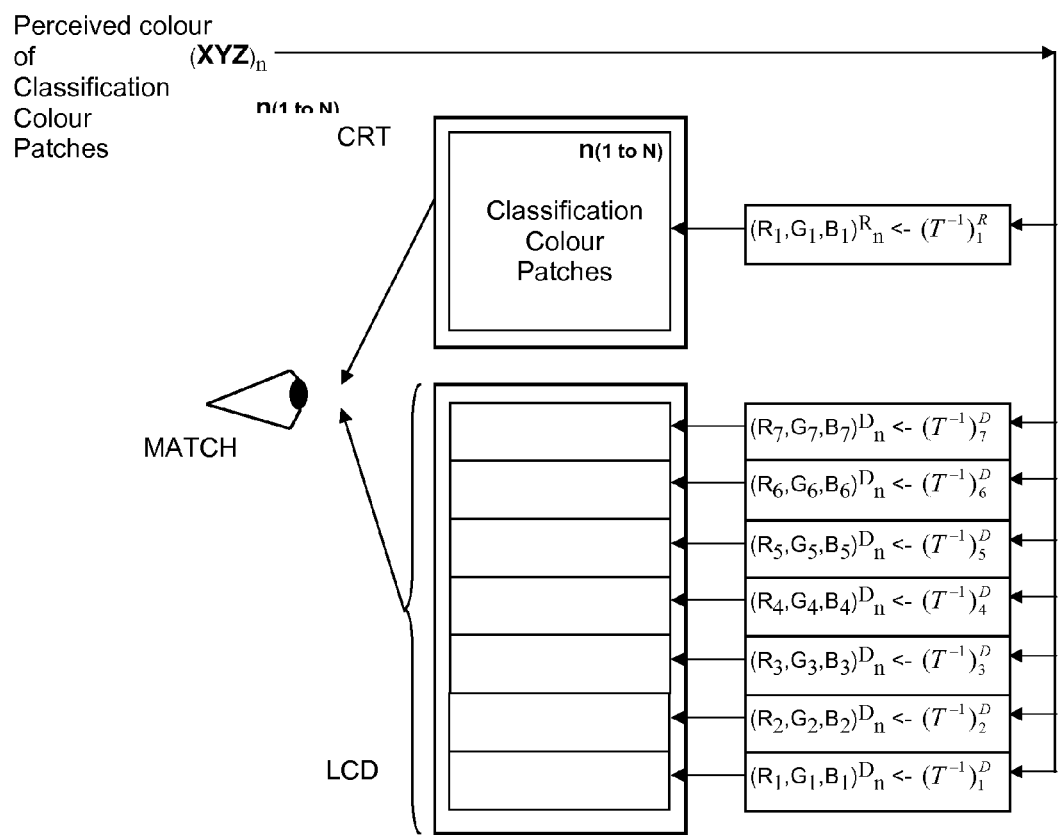
Figure 10:
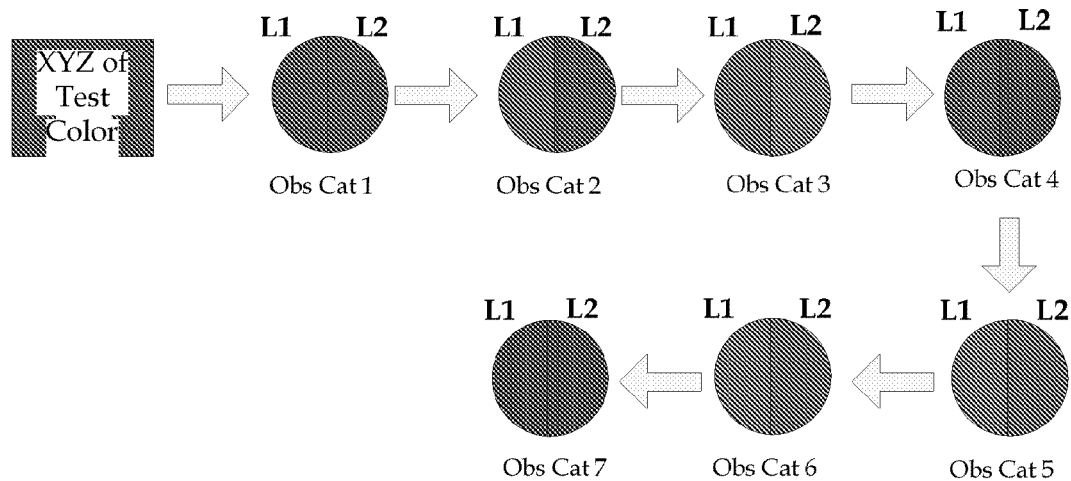
Figure 11:
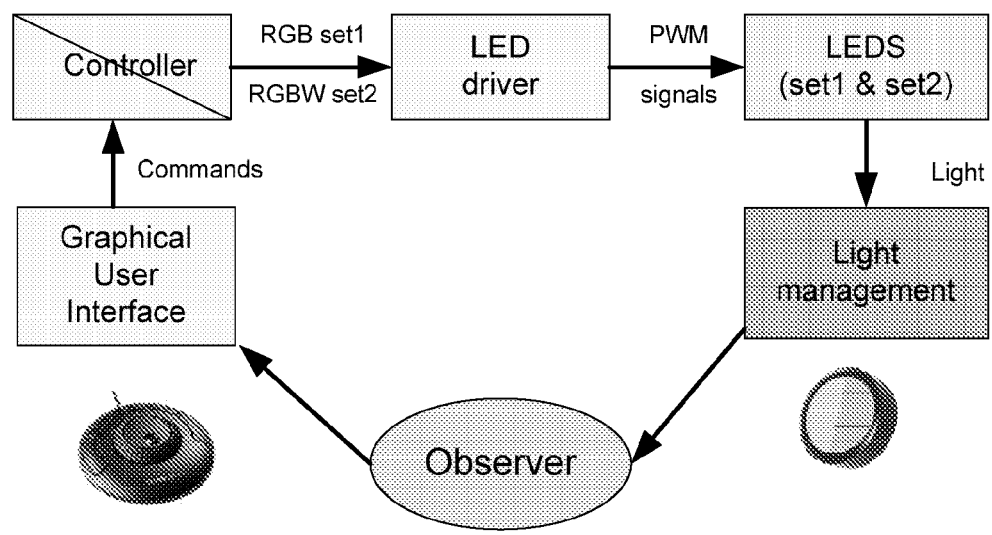
Figure 12:
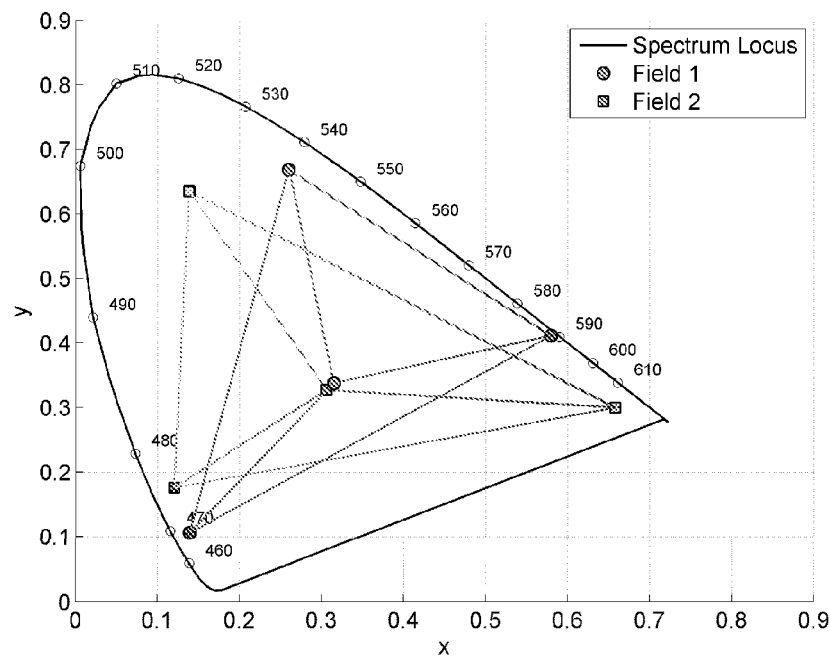
Figure 13:
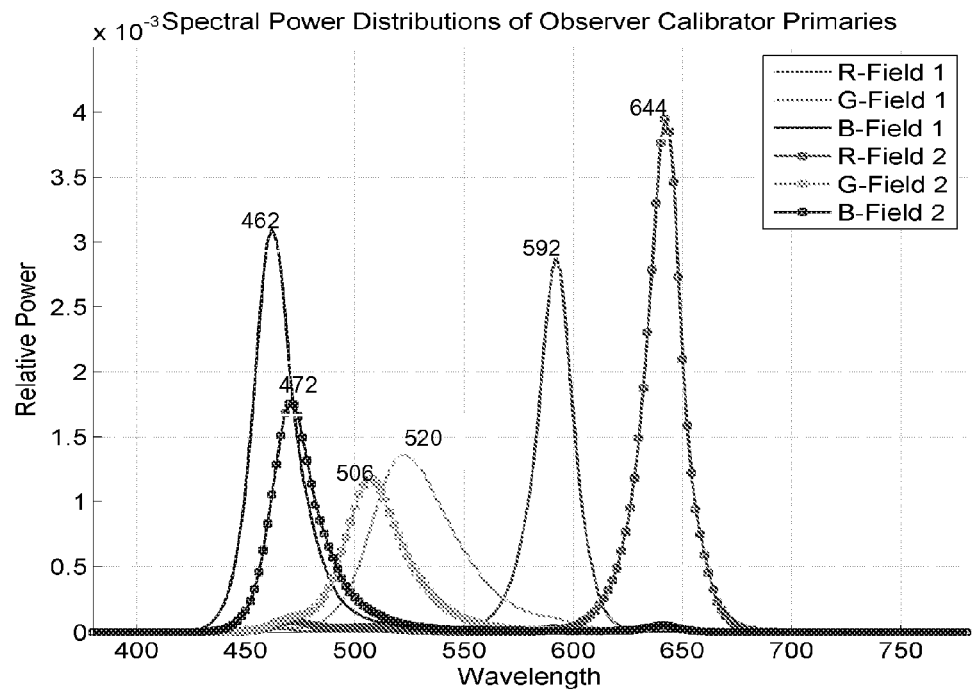
Figure 14:
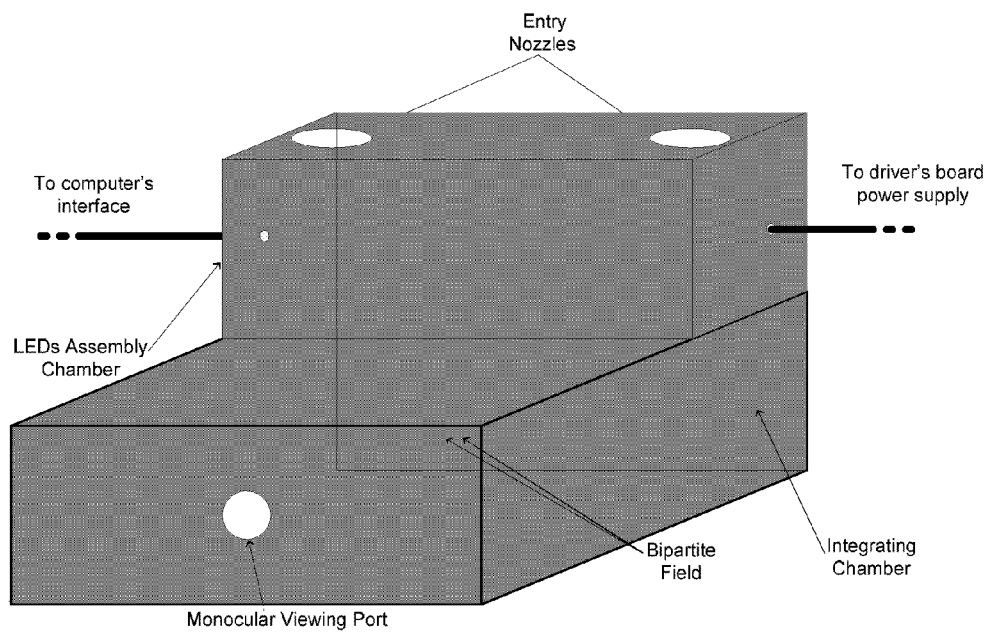
Figure 15:
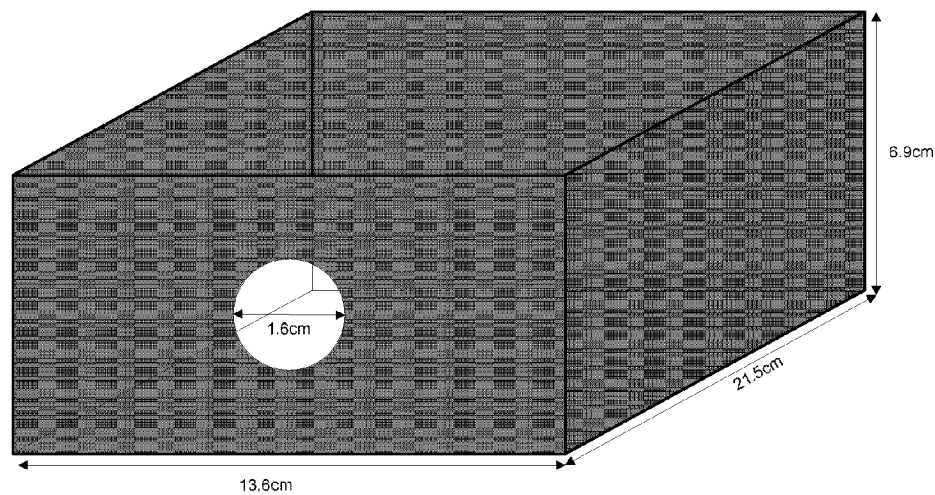
Figure 16:
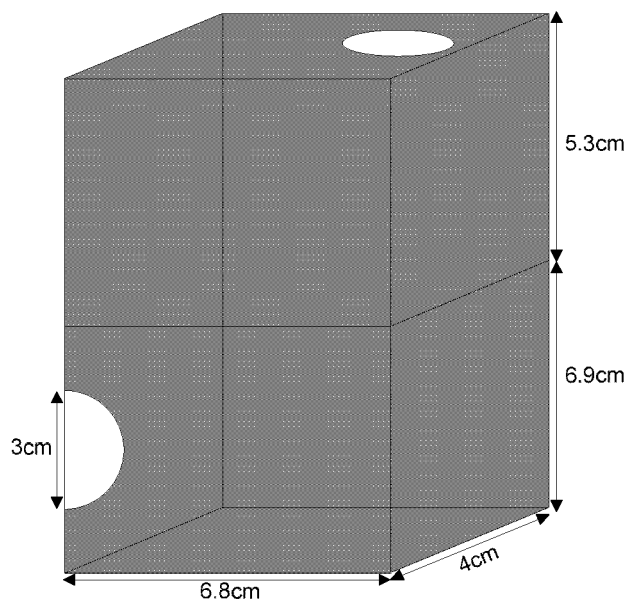
Figure 17:
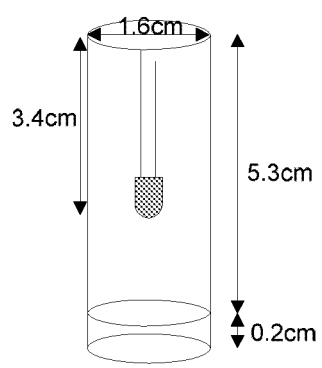
Figure 18:
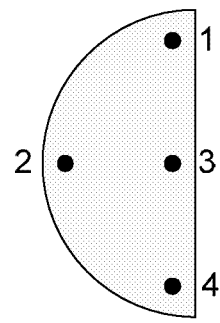

FIG. 8 gathers FIGS. 2, 3 and 4 in the same graph, additionally showing the wavelength ranges of high observer variability of colour perception;

FIG. 9 is another diagram illustrating an embodiment of the method for the classification of observers according to simultaneous presentation of the second colour versions;

FIG. 10 is another diagram illustrating an embodiment of the method for the classification of observers according to a sequential or successive presentation of pairs of first and second colour versions;

FIG. 11 is schematic of an apparatus for observer classification according to the second example of the invention;

FIG. 12 illustrates the color gamuts of the reference colour display device and of the test colour display device of the apparatus for observer classification of FIG. 11;

FIG. 13 illustrates the spectral distribution of emission of the LEDs used for the sets of primaries of the reference colour display device and of the test colour display device of the apparatus for observer classification of FIG. 11;

FIGS. 14 to 17 illustrate the details of optics and mechanics of the apparatus for observer classification of FIG. 11;

FIG. 18 illustrates four points of measurement to evaluate uniformity and intensity within each half of the bipartite field of the apparatus for observer classification of FIG. 11.

The functions of various elements shown in the figures, notably FIGS. 6, 9, 10 and 11, may be provided through the use of dedicated hardware as well as hardware capable of executing software in association with appropriate software. When provided by a processor, the functions may be provided by a single dedicated processor, by a single shared processor, or by a plurality of individual processors, some of which may be shared. When provided by a software, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU.

$1^{st}$ Step: Definition of Optimal Sets of 125 Observers, Each Observer being Characterized by a Set of 3 CMFs.

By classifying a combined dataset of 47 actual observer CMFs from the 1959 Stiles-Burch study, and 61 simulated CMFs obtained from the more recent CIE 2006 model (i.e. 108 CMFs in all, for a 10° field-of-view) using standard mathematical cluster analysis methods ("Partitioning method", also known as "K-means method"), an optimal number of five different sets of x-, y- and z-CMFs, defining 5×5×5 or 125 classes of observers, were found, achieving close to 1 unit of average colour difference prediction error ($\Delta E^*_{00}$) for a standard set of 240 colors, and for 47 Stiles-Burch observers. Instead of having only one standard observer as in the most common prior art, there are now 125 different classes of observers, and each actual observer can be assigned to one of these classes in order to be characterized with the set of CMFs corresponding to this class.

Practically, in the analysis, the total number of variables is 35 (normalized values at 35 wavelengths) and total number of observations is 108. The analysis was performed on LMS cone fundamentals, and the optimal LMS functions were then converted in a manner known per se into CMFs through a 3×3 transformation. A cluster analysis starts with undifferentiated groups and attempts to create clusters of objects (i.e. the CMFs) based on the similarities observed among a set of variables (i.e. CMF values at each wavelength). Variables are selected that maximally discriminate among objects (i.e. the CMFs). Increasing sample sizes result in increased cluster reliability.

The "Partitioning method" (or "K-means method") begins by partitioning the actual data (rather than similarity measures) into a specific number of clusters, and objects are assigned and reassigned in an iterative method to simultaneously minimize intra-cluster variability and maximize inter-cluster variability. This method was used as it is more likely to lead to a robust solution compared to other methods.

In the two-phase computational implementation in Matlab™ software, the first phase used batch updates, in which each iteration consisted of reassigning objects to their nearest cluster centroid, all at once, followed by recalculation of cluster centroids. The second phase used online updates, in which objects were individually reassigned if doing so would reduce the sum of distances, and cluster centroids were recomputed after each reassignment. Each cluster in the partition is defined by its member objects and by its centroid, or center.

Suitable wavelength ranges (i.e. the number of variables) were chosen for L, M and S. Initial cluster centroid locations were selected by dividing 20-80 age range in equal parts and using corresponding CIE-2006 functions. Squared Euclidean distance measure (in LMS space) was used in this analysis. The clustering was repeated 20 times (with same initial cluster centroid positions). Optimal functions were obtained by taking the mean of cluster members.

Each of the derived optimal sets of CMFs was then used to predict 47 Stiles-Burch observer data. The analysis was repeated to derive 3, 4, 5, 6 and 7 optimal sets of CMFs (in each set, one CMF for long-, medium- and short-wavelength range). Based on the accuracy of prediction, as illustrated in Table 1, 5 optimal sets of CMFs was found to be the minimal to meet the goal of achieving close to 1 unit of average colour difference ($\Delta E^*_{00}$) for a wide range of colors, and for all Stiles-Burch observers. With these 5 optimal sets of x-, y- and z-CMFs, there are now 5×5×5, or 125 possible classes of observers. CIELAB colour coordinates were computed for all colour patches of a reference colour chart (as the 240 colour patches of the Colourchecker DC™ reference colour chart) with a CIE illuminant D65, by using i) real Stiles-Burch observer CMF data, ii) CIE 1964 10° standard observer functions and iii) all possible combinations of each of the optimal set of CMFs derived from the above cluster analysis. Then, for each observer, colour differences ($\Delta E^*_{00}$) were computed between the CIELAB values obtained from real observer CMFs [case (i)] and those obtained from the predicted CMFs [case (ii) and (iii)]. Thus for each of the 47 Stiles-Burch observer, average colour difference $\Delta E^*_{00}$ is computed out of the 240 patches. Lower the average colour difference, the better is the model prediction.

Average and maximum values of these colour difference $\Delta E^*_{00}$ are shown in Table 1. All combinations of a limited number of CMFs (3 to 7) are compared to CIE 1964 10° observer (giving respectively $3^3=27$ to $7^3=343$ total possibilities). Note that for optimal CMF, the combination yielding best result was considered for individual observers (thus, each of the 47 observers had a corresponding best combination). Then the average or the maximum was computed.

TABLE 1

| CMFs Under Comparison | $\Delta E^*_{00}$ Color Difference w.r.t. Real Observer Data (Averaged Over all 47 Observers) | |
|---|---|---|
| | Average $\Delta E^*_{00}$ for 240 patches | Maximum $\Delta E^*_{00}$ for 240 patches |
| CIE 1964 10° standard observer | 0.9 | 2.1 |
| Optimal 3 (total 27) | 0.7 | 1.5 |
| Optimal 4 (total 64) | 0.6 | 1.5 |
| Optimal 5 (total 125) | 0.5 | 1.1 |
| Optimal 6 (total 216) | 0.4 | 0.7 |
| Optimal 7 (total 343) | 0.5 | 1.0 |

$2^{nd}$ Step: Definition of a Reduced Number of 7 Optimal Classes of Observers, Each Class being Characterized by a Set of 3 CMFs Representing the Colour Vision of a Specific Observer of this Class:

Out of the above-mentioned 125 possible combinations of CMFs, several combinations can meet the goal of achieving close to 1 unit of average $\Delta E^*_{00}$ for a given observer, and the said 240 Colorchecker samples. Thus, for the said constraint, fewer than 125 combinations will suffice for covering all the 47 observers. Thus in this $2^{nd}$ step, an iterative algorithm was implemented to pick the minimal number of combinations satisfying the average $\Delta E^*_{00}$ criterion for all 47 observers. The algorithm took into consideration that for some observers with very different color vision characteristics, an average $\Delta E^*_{00}$ value close to 1 may never be achieved. For each observer, a target $\Delta E^*_{00}$ was established based on statistical percentiles over all 240 patches. The suitability of a given CMF combination for all the 47 observers was determined by a "CMF Performance Index" (PI), based on average percent deviation from target $\Delta E^*_{00}$ (a positive PI indicated average $\Delta E^*_{00}$ was lower than the target). A combination for the reduced set was selected based on the highest number of observers with positive PI as well as the largest value of the PI.

Table 2 shows which of the 125 combinations, and their constituent x-, y-, z-functions were picked for the reduced sets of 7 observer classes. 4 x-CMFs, 3 y-CMFs and 3 z-CMFs constitute the reduced sets. Total number of Stiles-Burch observers assigned to each set, as well as cumulative percent of observers covered are listed. For example, combination 2 is made up of $1^{st}$ x-CMF, $1^{st}$ y-CMF and $2^{nd}$ z-CMF, satisfying the aforementioned $\Delta E^*_{00}$ criterion for 17 observers, which is 36.2% of Stiles-Burch observer pool. Combination 58 satisfies another 14 observers, so combinations 2 and 58 together satisfy 66% of Stiles-Burch observers, so on and so forth. As shown, these combinations were selected in an iterative process, excluding the observers satisfied by the prior combinations in the subsequent iterations.

TABLE 2

| Combination No | X-CMF No | Y-CMF No | Z-CMF No | Total Obs | Iteration No | % Obs Covered |
|---|---|---|---|---|---|---|
| 2 | 1 | 1 | 2 | 17 | 1 | 36.2 |
| 58 | 3 | 2 | 3 | 14 | 2 | 66 |
| 6 | 1 | 2 | 1 | 8 | 3 | 83 |
| 33 | 2 | 2 | 3 | 4 | 4 | 91.5 |
| 81 | 4 | 2 | 1 | 2 | 5 | 95.7 |
| 63 | 3 | 3 | 3 | 1 | 6 | 97.9 |
| 76 | 4 | 1 | 1 | 1 | 7 | 100 |
| | | Total Observers | | 47 | | |

FIGS. 2, 3 and 4 illustrate these seven optimal sets of CMFs, respectively for 4 x-CMFs, 3 y-CMFs and 3 z-CMFs.

Each set characterizes the colour vision of specific observer representing a class of observers.

3rd Step: Method for Classifying Actual Observers Over the Seven Classes of Observers, Each Class being Characterized by the Colour Vision of a Specific Observer, this Colour Vison being Characterized Itself by a Set of CMFs.

Based on the above defined seven classes of observers, an embodiment of a method of classification of actual human observers within these seven different classes will now be described.

In order to implement this embodiment, two different colour display devices are needed: a reference colour display device using a first set of primaries to display colour versions, and a test colour display device using a second set of primaries, different from the first one, to display other colour versions. As described with more detailed below, the primaries of the first set is notably adapted to generate versions of colours that are perceived approximately similarly by observers even when they have very different colour perception characteristics, as, on the opposite, the primaries of the second set is notably adapted to generate versions of colours that may be perceived very differently by observers even when they have only little difference in colour perception. As a matter of fact, to be able to identify differences between colour perception among various observers, according to which, as previously described, one observer with cone spectral sensitivities different from another observer does not have the same color perception as the other observer, the set of primaries of the reference colour display device should have a spectral distribution different from the spectral distribution of the set of primaries of the test colour display device. For instance, a CRT display device is used for the reference colour display device, and an LCD device, preferably with LED backlight, is used as the test colour display device.

Two examples of apparatus for observer classification that may be used to implement the embodiment of observers classification will now be described with more detail.

1st Example of Apparatus for Observer Classification:

Reference colour display device: 32" Sony BVM Cathode Ray Tube (CRT) display, which is widely used as a studio reference display, Test colour display device HP DreamColor™ (LP2480zx) Wide-Gamut Liquid Crystal Display (LCD) with LED backlight.

For both colour display devices, the luminance of the full white was set close to 97 cd/m$^2$.

Figures 5, 6:
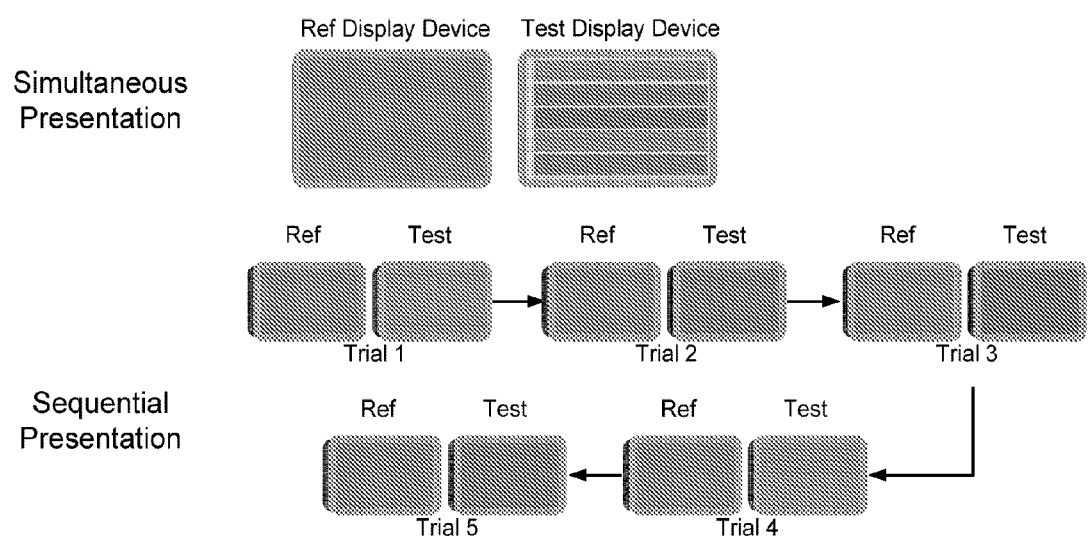
FIG. 6 are diagrams illustrating the two main embodiment of the method for the classification of observers, first according to a simultaneous presentation of the second colour versions, second according to a sequential or successive presentation of pairs of first and second colour versions.

Spectral power distributions of the two displays are illustrated on FIG. 5, which shows that there is a significant difference between the spectral distribution of the primaries of the two colour display devices, so that a colour match made on the two colour display devices is highly metameric in nature, justifying the choice of these two colour display devices for the observer classification. The LCD is representative of modern wide-gamut displays with peaky primaries. The CRT has a 10-bit HD/SDI input and the LCD has an 8-bit DVI input. Preferably, in at least one of the following spectral regions: 580 nm±12.5 nm, 520 nm±12.5 nm, and 426 nm±12.5 nm, the cumulative luminous intensity of the spectral distribution of the set of primaries of the LCD in the at least one region is superior by at least a factor 2 to the cumulative luminous intensity of the spectral distribution of the set of primaries of the CRT in this at least one region.

Figure 7:
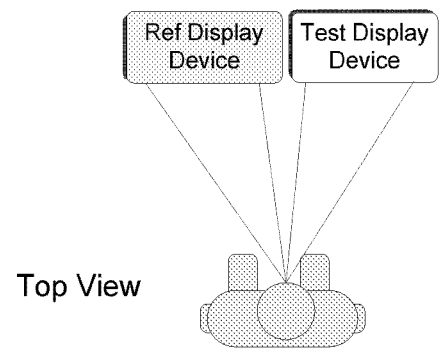
FIG. 7 illustrates very schematically an apparatus for observer classification according to the invention.

The display screens of the reference colour display device and of the test colour display device were placed side to side to form a bipartite field as illustrated on FIG. 7. The observer's visual field consists then of a 10° bipartite field, the right half of which was the LCD test screen, and the left half was the CRT reference screen, seen through the mirror. A mask was placed between the observer and the displays to block the view of the displays and the mirror, allowing the observer to see the test screen of the LCD on the right side of the field and the reference screen of the CRT on the left side of the field, when looking at the mask normally. The distance between the observer and the mask was 69.2 cm, and the distance between the mask and the screen of the LCD was 68 cm.

2nd Example of Apparatus for Observer Classification:

This specific example describes a portable instrument for observer classification comprising two LEDs sets, test LED set 1 and reference LED set 2, having significantly different spectral characteristics. Each LED set corresponds to a different set of primaries. In reference to FIG. 10, the observer to classify sees a first and a second version of colours generated by the two LED sets in a diffuse bipartite field, whose one left half is lit by test LED set 1, and the other right half is lit by the reference LED set 2. Therefore, the reference colour display device comprises the reference LED set 2 and the right half of the diffuse bipartite field as a display screen, and the test colour display device comprises the test LED set 1 and the left half of the diffuse bipartite field as a display screen. Based on the spectral characteristics of the LEDs of the two LED sets, appropriate control signals are sent these two LED sets so as to display matching colours on both halves of the bipartite field. As explained with more detail below, for any given colour of a classification chart, seven versions of matching colour pairs corresponding to seven observer categories are computed, and presented sequentially in the bipartite field, and the observer has to select one (or more if needed) pair that produces the best perceptual match for him or her. Based on several such trial of colour perception, the observer class or category that most often produces the best match is identified, which is the class or category assigned to the given observer. In a manner known per se, the instrument is interfaced to a computer or a micro-processor running a software application able to send control signals to the LED drivers to generate different versions of colors with both LED sets.

More precisely, in reference to FIG. 11, the design of the portable instrument involves five components, namely lighting, electronics, optics, mechanics and software.

In the portable instrument, the light sources of the set of primaries of each colour display device are composed of LEDs. The left test source has three LEDs, red, green and blue, and replicates a narrow-band test display device. The right reference source has four LEDs, one of which being a white LED, and replicates a broad-band reference display device. The white LED is kept at constant luminance, the effect of which is to de-saturate the other three primary LEDs of the right reference source. According to a variant, a set of only three LEDs, red, green and blue, could be sufficient on the right reference side, excluding the white LED, depending on the LED characteristics.

To increase the efficiency of the observer classification, it is preferred to have high perceptual variability among observers only in one half of the bipartite field, while the color perception in the other half remains relatively stable among observers. Different types of LEDs are chosen for the two sides based on multiple criteria, namely peak/dominant wavelength, peak luminous intensity and viewing angle. In reference to FIG. 8 explained below, in the selection of the 3-LED set for the left test side, preference was given to LEDs with peak wavelengths in the wavelength range of high variability of color perception among observers, as in the selection of the 4-LED set for the right reference side, LEDs with peak wavelengths in the region of low variability of color perception among observers were preferred. Preferably, the instrument is adapted to attain adequate and identical luminance levels on both halves. Both luminance and wavelengths of the LEDs directly affect the color gamut. A small color gamut restricts the choice of test colors that can be used in the calibrator system. For example, in reference to FIG. 12, color gamuts formed by the LEDs with peak wavelengths of 460 nm, 520 nm and 590 nm are significantly smaller than that corresponding to the LEDs with peak wavelengths of 470 nm, 500 nm and 640 nm. In at least one of the following spectral regions: 580 nm±12.5 nm, 520 nm±12.5 nm, and 426 nm±12.5 nm, the cumulative luminous intensity of the spectral distribution of the set of primaries of the test LED set 1 in the at least one region is superior by at least a factor 2 to the cumulative luminous intensity of the spectral distribution of the set of primaries of the reference LED set 2 in this at least one region.

In consideration of all above criteria, the best suited LEDs were chosen for the portable instrument, the spectral characteristics of which are illustrated on FIG. 13: LEDs with peak emission at 592 nm (R-Field 1), 520 nm (G-Field 1) and 462 nm (B-Field 1) for test LED set 1, and LEDs with peak emission at 644 nm (R-Field 2), 506 nm (G-Field 2) and 472 nm (B-Field 2) for reference LED set 2. Two LEDs of the test LED set 1 emits in the wavelength range of high variability of color perception, namely in a region having a width of about 25 nm and centered on 580 nm and on 520 nm. The three LEDs of the reference LED set 2 emits out of these wavelength ranges of high variability of color perception.

The electronics of the portable instrument receives commands from the software run by the computer or the microprocessor. As explained with more detail below, the controller then sends a set of three control values for LED set1 (RGB) and a set of four control values for LED set2 (RGBW) toward LED driver through communication link (I2C for example). The digital values are either quantified in 8 bits (0-255) or 10 bits (0-1023). The drivers modulate each LED using Pulse Width Modulation (PWM) technique.

FIGS. 14 to 17 illustrate the details of optics and mechanics of the portable instrument, which are simple and inexpensive, but still attain satisfactory color/luminance uniformity and intensity. Both chromaticities and luminance value were measured at various points within the field to test for uniformity and adequacy of light levels. FIG. 18 illustrates four points within each half of the bipartite field at which measurements were performed to evaluate uniformity and intensity. Luminance deviation was found around 5% or less, and a luminance greater than 15 cd/m2 could be achieved for a wide range of colors. This ensures photopic viewing condition. The LED systems have a fairly linear response, and have been characterized as explained below so that specific chromaticities and luminance can be generated.

Beyond the current design of the portable instrument, more advanced and compact opto-mechanical solutions could be developed (e.g. including integrating spheres or other uniformity generation optical elements such as Light guide pipe). A main point to achieve is high uniformity in the hemi-circular fields, being lit by one or the other set of LEDs described in previous paragraph.

The software of the portable instrument has preferably a graphical user interface for administering the observer classifying method described in detail below. It also has an interface to communicate with the LED driver control. It performs automatically the sequential sequence on the block diagram of FIG. 10, which is described in more detail below. It also has an interface to communicate with the electronic system. The software can either be embedded into a micro-processor for portable device for consumer application or on a computer.

The portable instrument can be reduced to a tiny device either integrated with a video color display device, or a stick-on calibrator device that can be attached to the screen of such a display device during its calibration. Thus the display color will form the reference half of the bipartite field, and the calibrator device generated color will form the other test half. The LEDs in the calibrator device will be so chosen as to generate high observer variability (i.e. high observer metamerism) between the device colors and the display colors, thus a given device with a specific set of LEDs will work the best when used with the display device with question.

Such a portable instrument or calibrator device will help in classifying a user into one of several classes or categories, and thus adjust the display processing to achieve more accurate color reproduction for this user. The user category can be switched by the push of a button, and user settings can be saved, allowing several users to use the video color display device. For simultaneous viewing by multiple users, a general setting (for example that of 10° standard observer) can be used. Such advanced display processing capabilities can be highly useful in color-critical professional applications, for example in post-production.

Another application could be in the form of a useful instrument for color research laboratories in the industry and academia. As explained before, ability to pre-sort color observers into various color vision categories can be immensely helpful in various psychophysical studies.

Apart from the two examples of apparatus for observer classifications above, as a reference colour display device and/or as a test colour display device, the following devices may also be used instead:
  a spectrum generator (e.g. OneLightSpectra or OL-490 systems);
  a multi-primary display (more than 3 primaries);
  a set of fixed spectra generating metameric colour pairs (e.g. colour prints like Ishihara tests, specific emitting material or devices—e.g. fluorescent material or phosphor, or lasers or e.g. laser excited material, . . . ).

Characterization of the Display Devices of the Apparatus for Observer Classification:

Before performing the classification test described below, the two colour display devices of the apparatus for observer classification are characterized to know which spectral power distribution (SPD) can be obtained for any set of control signals (R,G,B) used to control these colour display devices.

For characterizing the colour display devices for each set i of CMFs characterizing the colour vision of the specific observer of any given class Cl-i of observers, a pair of forward colour transforms and reverse colour transforms are used for each set of CMFs. Using the above definitions of the set of CMFs of the standard observer that allow to compute tristimulus values $(X_0,Y_0,Z_0)$ from any spectral power distribution (SPD) of a color, or to compute the set of control values $(R_0,G_0,B_0)$ that are used to control the colour display device to reproduce a color with tristimulus values $(X_0,Y_0,Z_0)$, representing this color as perceived by a standard observer, the two colour display devices are then characterized separately for various observers such that:
  for the reference display device, i.e. the CRT of the $1^{st}$ example above, $(R,G,B)^R-(T)_i^R \rightarrow (X_0,Y_0,Z_0)$, i.e. a forward colour transform $(T)_i^R$ for each set i of CMFs;
  for the test display device, i.e. the LCD of the $1^{st}$ example above,
  $(R,G,B)^D-(T)_i^D \rightarrow (X_0,Y_0,Z_0)$, a forward colour transform $(T)_i^D$ for each set i of CMFs.
  for the reference display device, i.e. the CRT of the $1^{st}$ example above, (SPD)→$(X_0,Y_0,Z_0)$→$(T^{-1})_i^R$→$(R_i,G_i,B_i)^R$, i.e. a reverse colour transform $(T^{-1})_i^R$ for each set i of CMFs
for the test display device, i.e. the LCD of the 1$^{st}$ example above,
(SPD)→$(X_0,Y_0,Z_0)$→$(T^{-1})_i^D$→$(R_i,G_i,B_i)^D$, i.e. a reverse colour transform $(T^{-1})_i^D$ for each set i of CMFs.

From each set of control values $(R,G,B)^R$ and $(R,G,B)^D$ respectively of the reference display device and of the test display device, the spectral color distribution of displayed colors, $(SPD)^R_i$ and $(SPD)^D_i$, can be obtained using display characteristics.

The mask of the apparatus for observer classification of the first example or of the optics of the portable instrument of the second example are included in the characterization of the display devices, to account for any spectral absorption or transmission of these components. At the beginning of each classification session described below, the luminance of the full-white of both colour display devices was measured to ensure that they were close. While both colour display devices were found to be quite stable in terms of full white luminance, radiometric data for both displays were collected after each colour match. Thus, the experimental results were independent of the stability of display characterization, or of the assumption of the validity of the display additivity and proportionality. For these radiometric measurements, one can use a PhotoResearch PR-670 spectroradiometer which is placed directly behind the observer at the eye level, and the two colour display devices can be measured in succession. The luminance as well as radiometric uncertainty relative to NIST was ±2% and spectral wavelength uncertainty was less than ±2 nm.

Example of Definition of a Classification Chart of Colour Patches Used for the Classification of the Observers:

The different colour patches that are usable for observer classification should preferably produce different perceptions for observers belonging to the same class, whatever is this class. In order to improve the efficiency of the classification method implemented on the apparatus for observer classification of the invention, the colour patches that produce the largest colour differences ($\Delta E^*_{00}$) between the seven classes of observers defined above were selected, as described below, from the 240 colour patches of the Colourchecker DC™ reference colour chart, such as to get an efficient classification chart of colour patches.

First, using colour display devices characterization data (see above), spectral power distributions (SPDs) were predicted for each n=1 to N colour patch $(CP)_n$ of the 240 colours patches of the Colourchecker DC™ reference colour chart when reproduced on the reference display device and on the test display device, as described above in the example of the apparatus for observer classification; the set of control values (R,G,B) are computed in the following way:
for the reference display device, i.e. the CRT of the 1$^{st}$ example above:
$(SPD)_n$→$(X_i,Y_i,Z_i)_n$−$(T^{-1})_i^R$→$(R_i,G_i,B_i)^R_n$
for the test display device, i.e. the LCD of the 1$^{st}$ example above:
$(SPD)_n$→$(X_i,Y_i,Z_i)_n$−$(T^{-1})_i^D$→$(R_i,G_i,B_i)^D_n$
By applying these sets of control values, the reproduced colour spectra will then be:
for the reference display device, i.e. the CRT of the 1$^{st}$ example above:
$(R_i,G_i,B_i)^R_n$→$(SPD)^R_{n,i}$;
for the test display device, i.e. the LCD of the 1$^{st}$ example above:
$(R_i,G_i,B_i)^D_n$→$(SPD)^D_{n,i}$.

$(SPD)^R_{n,i}$ and $(SPD)^D_{n,i}$ are then spectral power distributions generating the same perceived (metameric) colour as the "original" spectral power distribution $(SPD)_n$ for the class "i" of observer category, therefore resulting in the same tristimulus values $(X_i,Y_i,Z_i)_n$.

In the following discussion, a "Test colour" refers to a given Colourchecker patch $(CP)_n$ whose spectral reflectance data are known. From the reflectance data, 10° standard observer CMFs and $D_{65}$ illuminant spectral power distribution, tristimulus values $(X_0,Y_0,Z_0)$ are calculated. The reference display (e.g. CRT in the first example) inverse model gives a set of control signals (R,G,B) that generate each tristimulus values $(X_0,Y_0,Z_0)$. From this set of control signals, the spectral power distribution $(SPD)^R_n$ of the colour patch $(CP)_n$ displayed on the reference display device can be predicted. Multiplying this spectral power distribution $(SPD)^R_n$ with the seven i=1 to 7 "reduced" x-, y-, z-CMF gives the predicted tristimulus values $(X_i,Y_i,Z_i)^R_n$ in each case. In other words, these seven sets of tristimulus values $(X_i,Y_i,Z_i)^R_n$ correspond to different colours as perceived by seven observers whose CMFs match these seven CMF sets. The same reasoning applies for the test display device (e.g. LCD in the first example) with the predicted tristimulus values $(X_i,Y_i,Z_i)^D_n$ in each case.

Root-mean-square (rms) distances of each pair of $[(X_i,Y_i,Z_i)^R_n, (X_i,Y_i,Z_i)^D_n]$ tristimulus values signify how close the perceived colours of a given colour patch $(CP)_n$ are in terms of chromaticities for a given set i of CMFs. The variance (square of standard deviation) of these seven root-mean-square distances was used as a metric to determine how suitable is a colour patch for observer classification. High variance indicated more variability among the seven versions of the test colour.

Table 3 lists the first fifteen colour patches ("n" is the number of the colour patch CP as referenced in the reference colour chart) determined to be most suitable as test colours in the apparatus for observer classification for observer classification and forming a classification chart of colour patches. According to this determination, we found that these test colours are generally mostly different shades of green, green-yellow and blue-green and blue, but no or few shades of red are present.

TABLE 3

| | | | | | | Rank | | | | | | | | |
|---|---|---|---|---|---|---|---|---|---|---|---|---|---|---|
| 1 | 2 | 3 | 4 | 5 | 6 | 7 | 8 | 9 | 10 | 11 | 12 | 13 | 14 | 15 |
| "n" 92 | 34 | 153 | 158 | 191 | 49 | 197 | 54 | 196 | 216 | 36 | 39 | 48 | 49 | 211 |

The above results are also corroborated by an additional analysis, in which wavelength regions of x, y and z-CMF functions with highest variability among the seven observer classes were identified, and spectral power distributions of the display primaries were compared with these ranges. FIG. 7 gathers the seven sets of x, y and z-CMFs, which are respectively illustrated on FIGS. 2 to 3 and which correspond to the seven classes of observers, including the set of CMFs of the 10° standard observer (black dots). Wavelength ranges where x, y and z-CMFs have highest variability are shown as vertical shaded lines. The vertical thin black lines indicate the wavelengths where variances among the CMFs are the largest. From this figure, it can be seen that wavelengths around 580 nm, 520 nm and 426 nm have high variability in case of x, y and z-CMFs respectively. However, the variation in the x-CMFs of observer classes is generally relatively less significant around 625-630 nm, where the red primaries of the both displays devices of the apparatus for observer classification of the first example and of the reference display device of the apparatus for observer classification of the second example have sharp peaks. As a result, for colours with significant amount of red, there will generally be less perceptual difference among the seven classes of observers when using the apparatus for observer classification of the first example. This explains why selected colours for the classification chart used with the apparatus for observer classification of the first example may not include shades of red. This shows why the selection of colour patches that are the most suitable for the classification is dependent on the spectral characteristics of the display primaries of the two display devices used in the apparatus for observer classification used to implement the classification of the observers. One set of colour patches or classification chart that is suitable for classification with an apparatus for observer classification may not be appropriate for classification with an another apparatus. If the primaries of an colour display device are known, a set of colour patches suitable for observer classification can be determined using the method outlined above. The colour patches that are selected for the classification of the observers would preferably yield relatively high spectral power in one or more of the vertical-lines shaded wavelength regions of high variability of colour perception that are shown on FIG. 8, these regions having a width of about 25 nm and being respectively centered on 580 nm, 520 nm and 426 nm. Note that these wavelength regions are specific to the optimal CMFs, are thus fundamental, and independent of the display devices used in the apparatus for observer classification.

Example of Classification Method Implemented on the Apparatus for Observer Classification of the Invention:

FIG. 9 shows a block diagram of an embodiment of observer classification method, that uses the above defined seven sets of CMFs, each set representing the colour vision of a specific observer of a class of observers.

Given the spectral power distribution $(SPD)_n$ of the $n^{th}$ colour patch (out of a total of N colour patches in the classification chart) and its intrinsic colour $(CP)_n$, and given the characterization data of the colour display devices (see above), different sets of control signals (R,G,B) are computed in order to display different versions of each colour $(CP)_n$, such that, for each colour $(CP)_n$:

for the reference display device, i.e. the CRT of the 1$^{st}$ example above: only a first set of control signals $(R_1,G_1,B_1)^R_n$ adapted to display a first version of this colour, using the first set of primaries of the reference display device wherein this first version is perceived as this colour by the specific observer of the 1$^{st}$ class Cl-1: $(SPD)_n \rightarrow (X_1,Y_1,Z_1)_n - (T^{-1})_1^R \rightarrow (R_1,G_1,B_1)^R_n$;

for the test display device, i.e. the LCD of the 1$^{st}$ example above: seven different sets of control signals $(R_i,G_i,B_i)^D_n$, for i=1 to 7, where each set of control signals $(R_i,G_i,B_i)^D_n$ is adapted to display a second version of this colour, using the second set of primaries of the test display device wherein this second version is perceived again as this colour but by the specific observer of the class Cl-i: $(SPD)_n \rightarrow (X_i,Y_i,Z_i)_n - (T^{-1})_i^D \rightarrow (R_i,G_i,B_i)^D_n$.

Then, using the apparatus for observer classification as described above, the above first and second versions of each colour $(CP)_n$ of the 1 to N colour patches of the classification chart are displayed using both colour display devices as follows:

using the reference display device, i.e. the CRT of the 1$^{st}$ example above, a first version of this colour $(CP)_n$ is displayed on the whole screen of this display device, by applying the first set of control signals $(R_1,G_1,B_1)^R_n$ corresponding to this colour over the whole screen;

the screen of the test display device, i.e. the LCD of the 1$^{st}$ example above, being divided into seven equal stripes, all second versions of this colour $(CP)_n$ are displayed on the screen of this display device and distributed over the different stripes of this screen, such that each second version is displayed in a dedicated stripe by controlling the test display device by the corresponding second set of control signals $(R_i,G_i,B_i)^D_n$ corresponding to this colour.

The actual observer-to-classify being installed to view both screens in the same bipartite field, for each colour $(CP)_n$ of the classification chart, he or she is asked to compare each i=1 to 7 of the second versions of this colour displayed in stripes on the screen of the test display device with the first version of the same colour displayed on the screen of reference display device. The number i of the matching second version that is selected by the observer-to-classify is then registered as corresponding, for this specific colour $(CP)_n$, to the class Cl-i of the observer. In summary, one first version of a given colour is displayed on the screen of the reference display device and seven other second versions of the same colour are displayed on the screen of the test display device, one of which should ideally give the best match with the first colour version for a given observer. For example, an observer whose CMFs are closer to the set of CMFs of the first class than other set of CMFs, will find the first of the second versions (i.e. i=1) of this colour as displayed with the test display device to be the closest match to the first version of the same colour as displayed with the reference display device. Similarly, an observer whose CMFs to the set of CMFs of the second class Cl-2 than other set of CMFs, will find the second of the second versions (i.e. i=2) of this colour to be the best match to the first version of the same colour as displayed with the reference display device, so on and so forth.

If the above embodiment of the method of classification, all second versions of each colour are simultaneous displayed by the test display device, as illustrated on FIG. 9. According to another preferred embodiment of the method of classification, the second versions of each colour are successively displayed on the entire screen of the test display device, besides the screen of the reference display device on which the first version of the same colour is displayed as previously described. Such an embodiment leads to seven consecutive trials as illustrated on the block diagram of the sequential presentation of FIG. 6 when using the apparatus for observer classification of the first example, and on the block diagram of FIG. 10 when using the apparatus for observer classification of the second example, to finally get the same results concerning the closest match.

Based on observer's selections for each of the displayed colour patches of the classification chart, by averaging the different selection, one of the seven classes of observer CMFs that best correspond to this observer can be identified as being the class to which this observer belongs.

An example of matching results is given in table 4 for a given observer to classify: the line "match" gives the number i of the best matching stripe displayed by the LCD for the 15 colour patches selected in table 2. From an average of these results, the given observer is classified in class 3 (i.e. i=3) and is considered as being characterized by the set of CMFs corresponding to this class.

TABLE 4

| CP: "n" | | | | | | | | | | | | | | |
|---|---|---|---|---|---|---|---|---|---|---|---|---|---|---|
| 137 | 136 | 147 | 115 | 170 | 117 | 169 | 171 | 144 | 134 | 127 | 135 | 118 | 116 | 113 |
| Match | | | | | | | | | | | | | | |
| 2 | 3 | 3 | 4 | 3 | 5 | 3 | 3 | 4 | 5 | 3 | 3 | 1 | 3 | 3 |

As a conclusion, the method of classification allows to assign any actual observer to one of above-defined classes and to its corresponding set of CMFs. The invention may also applied to any other classification of actual observers according a set of CMFs.

More generally, this invention will enable a large range of observers having large variations of CMFs to have very similar perception of colours, allowing true comparison of these perceptions.

While the present invention is described with respect to particular examples and preferred embodiments, it is understood that the present invention is not limited to these examples and embodiments. The present invention as claimed therefore includes variations from the particular examples and preferred embodiments described herein, as will be apparent to one of skilled in the art. It is to be understood that the invention may be implemented in various forms of hardware, software, firmware, special purpose processors, or combinations thereof.

The invention claimed is:

1. Apparatus for classifying a visual observer among a plurality of M observer classes, wherein each class is characterized by the colour vision of a specific observer, wherein M≥3, and where the colour vision of the specific observers of these M observer classes are different, comprising:
    a reference colour display device using a first set of primaries $(DP)^R$ to display versions of colours on a first screen, and a test colour display device using a second set of primaries $(DP)^D$ to display versions of colours on a second screen, said first set of primaries $(DP)^R$ being different from said second set of primaries $(DP)^D$;
    a memory storing a classification chart of a plurality of N different colours $(CP)_{n=1 \ to \ N}$;
    means for providing, for each colour $(CP)_n$ of said classification chart stored in said memory, a first version of said colour $(CP)_n$ displayable on said first screen by said reference colour display device, and, moreover, for each (Cl-i) of said M classes of observers, a second version of said colour $(CP)_n$ displayable on said second screen by said test colour display device which is defined such that, when displayed on the second screen, this second version is perceived as the same colour as the colour perceived on the first screen when displaying said first version by the specific observer the color vision of which characterizes said observer class (Cl-i);
    means to present, in front of said observer-to-classify, a first version of each colour $(CP)_n$ displayed by said reference colour display device and each of the M second versions of the same colour displayed by said test colour display device,
    a selector provided with a command allowing said observer-to-classify to select, each time a color of said classification chart is presented to observer-to-classify as a first displayed version and as M different second displayed versions, which one of said displayed second versions of said color is perceived by said observer-to-classify as matching the best with his perception of the corresponding first displayed version of the same color;
    means for assigning said observer-to-classify to the same observer class (Cl-i) as the observer class of the specific observer who perceives the second version that is selected by said selector as having the same color as the first version that is simultaneously displayed;
    means for averaging the class assignments of said observer-to-classify performed by said means for assigning over all selections performed using said selector, in order to deliver a global assignment of said observer to at least one of said plurality of M classes of observers.

2. Apparatus according to claim 1, wherein the presenting means are adapted to present versions of colour successively by pairs, each pair comprising a first version of a colour and one of said second versions of the same colour presented within the same bipartite field.

3. Apparatus according to claim 1, wherein the presenting means are adapted to present simultaneously, within the same field, a first version of a colour and all second versions of the same colour.

4. Apparatus according to claim 1 wherein, in at least one of the following spectral regions: 580 nm±12.5 nm, 520 nm±12.5 nm, and 426 nm±12.5 nm, the cumulative luminous intensity of the spectral distribution of said second set of primaries in said at least one region is superior by at least a factor 2 to the cumulative luminous intensity of the spectral distribution of said first set of primaries in said at least one region.

5. Apparatus according to claim 4 wherein each primary of at least the second set of primaries is provided by LEDs.

6. Apparatus according to claim 1 wherein the N different colours of said classification chart are such that, for an observer of any of the M observer classes, any two different colours of this chart produce different colour perceptions for said observer, when theses colours are.

7. Apparatus according to claim 1 wherein the N colours of said classification chart are such that, over each color of said classification chart and over each specific observer of the plurality of M classes, the difference between the perception of the first version of said colour displayed by said reference colour display device and the perception of the second version of said colour for said observer class displayed by said test colour display device is maximized.

* * * * *